United States Patent
Noland

(10) Patent No.: US 12,145,420 B2
(45) Date of Patent: Nov. 19, 2024

(54) DYNAMIC TAG E-AXLE AND METHOD FOR CONTROLLING A DRIVETRAIN HAVING A DYNAMIC TAG E-AXLE

(71) Applicant: Hyliion Inc., Cedar Park, TX (US)

(72) Inventor: George James Noland, Sarver, PA (US)

(73) Assignee: Hyliion Inc., Cedar Park, TX (US)

( * ) Notice: Subject to any disclaimer, the term of this patent is extended or adjusted under 35 U.S.C. 154(b) by 0 days.

(21) Appl. No.: 18/540,362

(22) Filed: Dec. 14, 2023

(65) Prior Publication Data
US 2024/0109382 A1   Apr. 4, 2024

Related U.S. Application Data

(63) Continuation of application No. 17/542,207, filed on Dec. 3, 2021, now Pat. No. 11,884,124.

(51) Int. Cl.
*B62D 61/12* (2006.01)
*B60G 9/04* (2006.01)
*B60K 6/26* (2007.10)

(52) U.S. Cl.
CPC .......... *B60G 9/04* (2013.01); *B60K 6/26* (2013.01); *B62D 61/12* (2013.01); *B62D 61/125* (2013.01); *B60G 2300/402* (2013.01); *B60G 2300/50* (2013.01); *B60G 2400/60* (2013.01); *B60G 2400/732* (2013.01); *B60G 2400/82* (2013.01)

(58) Field of Classification Search
CPC ............................ B60G 9/04; B60G 2300/402; B60G 2300/50; B60G 2400/30; B60G 2400/50; B60G 2400/60; B60G 2400/82; B60G 2400/821; B62D 61/12; B62D 61/125

USPC ................................................ 701/37, 40, 48
See application file for complete search history.

(56) References Cited

U.S. PATENT DOCUMENTS

| | | | |
|---|---|---|---|
| 11,220,304 B1 * | 1/2022 | Bailey | B62D 61/125 |
| 2002/0117823 A1 * | 8/2002 | Mlsna | B62D 61/12 |
| | | | 280/43.23 |
| 2016/0318406 A1 | 11/2016 | Healy | |
| 2016/0318421 A1 | 11/2016 | Healy | |
| 2020/0369157 A1 | 11/2020 | Csontos et al. | |
| 2022/0258604 A1 | 8/2022 | Mastroianni et al. | |

(Continued)

OTHER PUBLICATIONS

Keles, T., et al., "ECU controlled intelligent lift axle dropping and lifting system for heavy trucks," Engineering and Science Technology, Journal 22 (2019), pp. 885-893.

(Continued)

*Primary Examiner* — Erick R Solis
(74) *Attorney, Agent, or Firm* — Baker Botts L.L.P.

(57) ABSTRACT

A system and method for adjusting a drivetrain comprising an e-axle on a vehicle comprises accessing route data and compressing the route data into a plurality of linearized segments. Each segment is determined by analyzing points along the route to determine when a set of route data points indicates an uphill, downhill, or flat segment. Using the segments, drivetrain configuration information for a vehicle and a weight of the vehicle, embodiments determine a performance plan that is tailored to the vehicle, including raising the e-axle to reduce rolling resistance on some segments and lowering the e-axle for some segments for increased power for acceleration, improved braking, or increased regenerative capabilities.

19 Claims, 8 Drawing Sheets

(56) References Cited

U.S. PATENT DOCUMENTS

2022/0344964 A1   10/2022   Duarte
2022/0388586 A1   12/2022   Seeger
2023/0150482 A1*   5/2023   Prokes ............... B60G 17/0165
                                                                    701/37

OTHER PUBLICATIONS

Wabco, Trailer Solutions—Lift Axle Control, https://www.wabco-auto.com/emea/Our-Solutions/Trailer-solutions/Trailer-Efficiency/Trailer-Suspension-Controls/Lift-Axle-Control. Dec. 3, 2021.

* cited by examiner

FIG. 3

| POINT ID (PID) | LATITUDE | LONGITUDE | ELEVATION (FT) |
|---|---|---|---|
| 1 | 30.2672 | 97.7431 | 429 |
| 2 | 30.2673 | 97.7440 | 427 |
| 3 | 30.2678 | 97.7489 | 430 |
| N | 30.2770 | 97.7500 | 428 |

FIG. 4

| SEGMENT ID (SID) | START POINT | END POINT | GRADE | DISTANCE (MILES) | DISTANCE FROM ROUTE START POINT (MILES) | SURFACE | ROAD TYPE | TRAFFIC? |
|---|---|---|---|---|---|---|---|---|
| 1 | PID1 | PID24 | 3 | 4.5 | 0 | CONCRETE | URBAN | YES |
| 2 | PID25 | PID56 | 0 | 12 | 9 | PAVED | HIGHWAY | YES |
| 3 | PID57 | PID84 | -2 | 7 | 11.2 | PAVED | RURAL | NO |
| N | PID2164 | PIDN | 4.2 | 3.8 | 23.4 | GRAVEL | OTHER | NO |

| ENGINE STATE | ENGINE RPM | ENGINE OUTPUT POWER | E-AXLE POSITION | M/G STATE | M/G INPUT/ OUTPUT POWER | LOSSES DUE TO E-AXLE | DRIVETRAIN EFFICIENCY |
|---|---|---|---|---|---|---|---|
| ON | 1500 | 300 | DOWN | G | +15 | 3% | 82% |
| ON | 1450 | 290 | DOWN | OFF | 0 | 3% | 84% |
| ON | 1350 | 270 | UP | OFF | 0 | 0 | 87% |
| OFF | 0 | 0 | DOWN | M | -80 | 2% | 86% |
| ON | 800 | 50 | DOWN | M | -80 | 2% | 88% |

FIG. 7

| | GRADE | ENGINE STATE | ENGINE RPM | M/G STATE | M/G OUTPUT/ INPUT | E-AXLE STATE | BATTERY SOC | BATTERY TARGET SOC | BATTERY TEMP |
|---|---|---|---|---|---|---|---|---|---|
| SEGMENT ID_1 | 3 | ON | 1500 | GENERATOR | +15 | UP | 50 | 75 | 40 |
| SEGMENT ID_2 | 0 | OFF | 0 | MOTOR | -5 | UP | 75 | 60 | 30 |
| SEGMENT ID_3 | -2 | OFF | 0 | GENERATOR | +3 | DOWN | 60 | 66 | 25 |
| SEGMENT ID_N | 4.2 | ON | 2250 | MOTOR | -10 | UP | 45 | 25 | 28 |

FIG. 9

DYNAMIC TAG E-AXLE AND METHOD FOR CONTROLLING A DRIVETRAIN HAVING A DYNAMIC TAG E-AXLE

BENEFIT CLAIM

This application claims the benefit under 35 U.S.C. § 120 as a continuation of application Ser. No. 17/542,207, filed Dec. 3, 2021, the entire contents of which are hereby incorporated by reference as if fully set forth herein. Applicant hereby rescinds any disclaimer of claim scope in the application(s) of which the benefit is claimed and advises the USPTO that the present claims may be broader than any application(s) of which the benefit is claimed.

BACKGROUND

Field of the Disclosure

This disclosure relates generally to controlling operation of a chassis in a large vehicle and, more particularly, to changing the drivetrain configuration to achieve target values for operating parameters of drivetrains installed in large vehicles configured for transporting cargo of different weights over routes of varying terrain.

Description of the Related Art

As used herein, the term vehicle may refer to any large vehicle that may be used to efficiently transport cargo and be capable of traveling over routes that include a wide range of surfaces from dirt paths in remote areas to concrete roads in urban settings. These vehicles generally comprise a chassis having a front axle and two rear axles, wherein typically one rear axle is a drive axle and the other rear axle supports a portion of the vehicle weight. Examples of chassis include box trucks in which a cab is attached to cargo compartment, a bus in which the driver area is integrated with a passenger compartment, and a semi-tractor (also referred to as a semi, a tractor or a truck) that is configured for coupling to a trailer comprising the cargo compartment (wherein the combination may be referred to as a tractor-trailer).

Vehicles, particularly tractor-trailers, are used to transport large volumes of cargo on land, wherein the combination of the tractor and the trailer can weigh between 30,000 pounds empty up to 140,000 pounds for a tandem loaded trailer. In many of these vehicles, a drivetrain comprises an internal combustion engine coupled to the drive axle. A traditional internal combustion engine is commonly sized in the range of 15 liters to provide enough power to drive the tractor-trailer with a range of cargo weight over various routes with unimproved surfaces and on varying grades.

On flat terrain, if the vehicle is moving at constant speed, a minimum amount of energy is needed to keep the vehicle moving. If the driver wants to accelerate, the driver depresses the accelerator pedal, wherein the vehicle accelerates based on how far the accelerator pedal is depressed and how much the vehicle weighs. If the driver greatly depresses the accelerator pedal, the vehicle generates more power and accelerates more quickly but the engine produces more emissions. If the driver lightly depresses the accelerator pedal, the vehicle accelerates more slowly but the engine produces less emissions. If the driver wants to decelerate, the driver can disengage the drive axle from the engine and allow the vehicle to coast, whereby emissions are minimal. If the driver wants to decelerate more quickly, the driver can relieve pressure on the accelerator pedal whereby the transmission provides resistance to slow the vehicle. If the driver wants to decelerate even more quickly, the driver can relieve pressure on the accelerator pedal to use the transmission to slow the vehicle and the driver can also apply pressure to a brake pedal to engage a brake system to resist rotation of one or more axles. If the driver wants to decelerate even more quickly, the driver may apply pressure to the brake pedal to engage the brake system to resist rotation of one or more axles and use engine braking, whereby the engine provides resistance when the drive axle is engaged with the engine. Engine braking can be loud and can increase emissions produced by the engine.

On uphill terrain, the driver may use the techniques used on flat terrain, but the engine will generally produce more emissions when the vehicle is traveling at a constant speed or accelerating.

On downhill terrain, the driver may use the techniques used on flat terrain, but the engine will generally produce less emissions when the vehicle is traveling at a constant speed or accelerating. When a vehicle is descending a slight decline or braking is not an issue, the drive axle may be disengaged from the engine to allow the vehicle to coast. For example, a driver in a vehicle with a manual transmission may use a clutch to disengage the transmission from the engine, or an automatic transmission may execute instructions to disengage the drive axle. When a vehicle is descending a medium downhill grade and the driver is trying to slow down, the drive axle remains engaged and the driver may use hydraulic brakes to slow rotation of the axles. When a vehicle is descending a steep downhill grade or the driver is trying to slow down more quickly, the drive axle remains engaged and the driver may use hydraulic brakes to slow rotation of the axles and use engine braking. At grades less than a maximum grade threshold, if the transmission is disengaged from the engine, the vehicle may coast at constant speed or even increase speed. The grade, the road surface, the vehicle weight, and any rolling resistance provided by the transmission and engine factor into what grade is the maximum grade threshold.

A road with a steeper grade is more likely to have curves, including switchbacks and other features to provide a more gradual slope and avoid situations in which a heavy vehicle is traveling down a steep grade and the brakes fail or become ineffective due to heat buildup or the vehicle traveling up a steeper grade and the engine stalls for lacking sufficient power to transport the cargo.

SUMMARY

Vehicles with chassis described herein may include a drivetrain comprising a motor/generator that can be configured to receive electric power and generate rotational power or receive rotational power and generate electric power, a battery system and a dynamic tag e-axle coupled to the motor/generator, wherein the dynamic tag e-axle refers to an e-axle that may be raised to an up position or lowered to a down position as the vehicle is traveling and a controller executes instructions to determine when to raise or lower the e-axle. When the e-axle is in the up position, wheels coupled to the e-axle do not contact the ground and when the e-axle is lowered to a down position, wheels coupled to the e-axle contact the ground. Raising the e-axle eliminates the rolling resistance of the tires and any rotational losses from the e-axle and may reduce the overall losses of the vehicle. In some embodiments, the e-axle and the motor/generator are integrated as a single unit. The vehicle may be a vehicle in which both rear axles are coupled to electric motors or a first rear axle is coupled to an electric motor and the second rear axle is coupled through a drive axle to an engine.

Vehicles may have unique drivetrains with one of several different types of motor/generators and battery systems, with each drivetrain being configurable to supply rotational power by an engine (if installed) or a motor and further configurable to generate electric power by regenerative power and (if installed) an engine or other power source. Each drivetrain may be configurable for transporting the same cargo weight over the same route but may operate under different operating parameters.

An operation server may use route information for a particular route and drivetrain configuration information for a particular vehicle to generate a performance plan for operating the vehicle on the route and communicate the performance plan to the vehicle. A performance plan may comprise target values for a set of operating parameters for the motor, the battery system and the e-axle to minimize operating cost of the vehicle over the route, minimize environmental impact of the vehicle over the route or extend a service life for the vehicle. A performance plan may further comprise target values for a set of operating parameters for an engine or power source if installed on the vehicle.

A route planning server may get route data having hundreds or thousands of route data points between a route start point and a route end point and compress the route data into a plurality of linearized segments. Each segment has a segment start point and a segment end point, a grade and a distance, and may also include other information about the road surface, traffic, weather or other conditions that could affect the performance of a vehicle traveling on the segment.

A vehicle configuration server may communicate with an engineering server and/or a vehicle to determine a drivetrain configuration and a set of operating parameters for the vehicle.

In one aspect, a vehicle comprises a chassis having a frame, a cab, and a plurality of axles coupled to wheels, and a drivetrain comprising a motor (operable as either a motor or a generator), a battery system containing an array of batteries, an e-axle coupled to the motor and configurable to be raised into an up position or lowered to a down position, and a drivetrain management system including a controller executing instructions to determine when the e-axle should be in the up position and when the e-axle should be in the down position, and further executing instructions to raise or lower the e-axle. A drivetrain may include an engine coupled to a motor/generator, wherein the engine is configured to supply rotational power to the motor/generator (operating as a generator) to charge the batteries or to supply generated electric power to a second motor/generator operating as a motor to generate rotational power through one or more e-axles. A drivetrain may include an engine coupled to a mechanical transmission coupled to a first drive axle and also coupled to a motor/generator, wherein the engine is configured to supply rotational power to the motor/generator (operating as a generator) to charge the batteries or to supply generated electric power to a second motor/generator operating as a motor to generate rotational power through one or more e-axles.

A vehicle may have a set of sensors for sensing operating conditions related to road conditions and operation of the drivetrain. The set of sensors may be configured to sense values of road conditions and operating parameters of the batteries, the motor and an e-axle. The set of sensors may be configured to sense values of operating parameters of an engine, a transmission coupled to the engine, the e-axle, a cab air-conditioning system, and a trailer air-conditioning system, if present.

A vehicle also comprises a control system including a processor or controller configured to receive a performance plan comprising values for a plurality of operating parameters for the vehicle and dynamically adjust operation of one or more of the motor, and the position of the e-axle based on the performance plan. A vehicle also comprises a control system including a processor or controller configured to receive a performance plan comprising values for a plurality of operating parameters for the vehicle and dynamically adjust operation of one or more of the motor, the position of the e-axle, the batteries, an engine and a transmission.

BRIEF DESCRIPTION OF THE DRAWINGS

For a more complete understanding of the present invention and its features and advantages, reference is now made to the following description, taken in conjunction with the accompanying drawings, in which:

FIG. 3 depicts a data structure containing basic GPS data representing a route;

FIG. 4 depicts a data structure containing basic segment information corresponding to the route;

FIG. 7 depicts a data structure containing multiple sets of possible values of a set of operating parameters for a drivetrain;

FIG. 9 depicts a data structure containing a set of operating parameters for a performance plan for a drivetrain.

Figure 1:
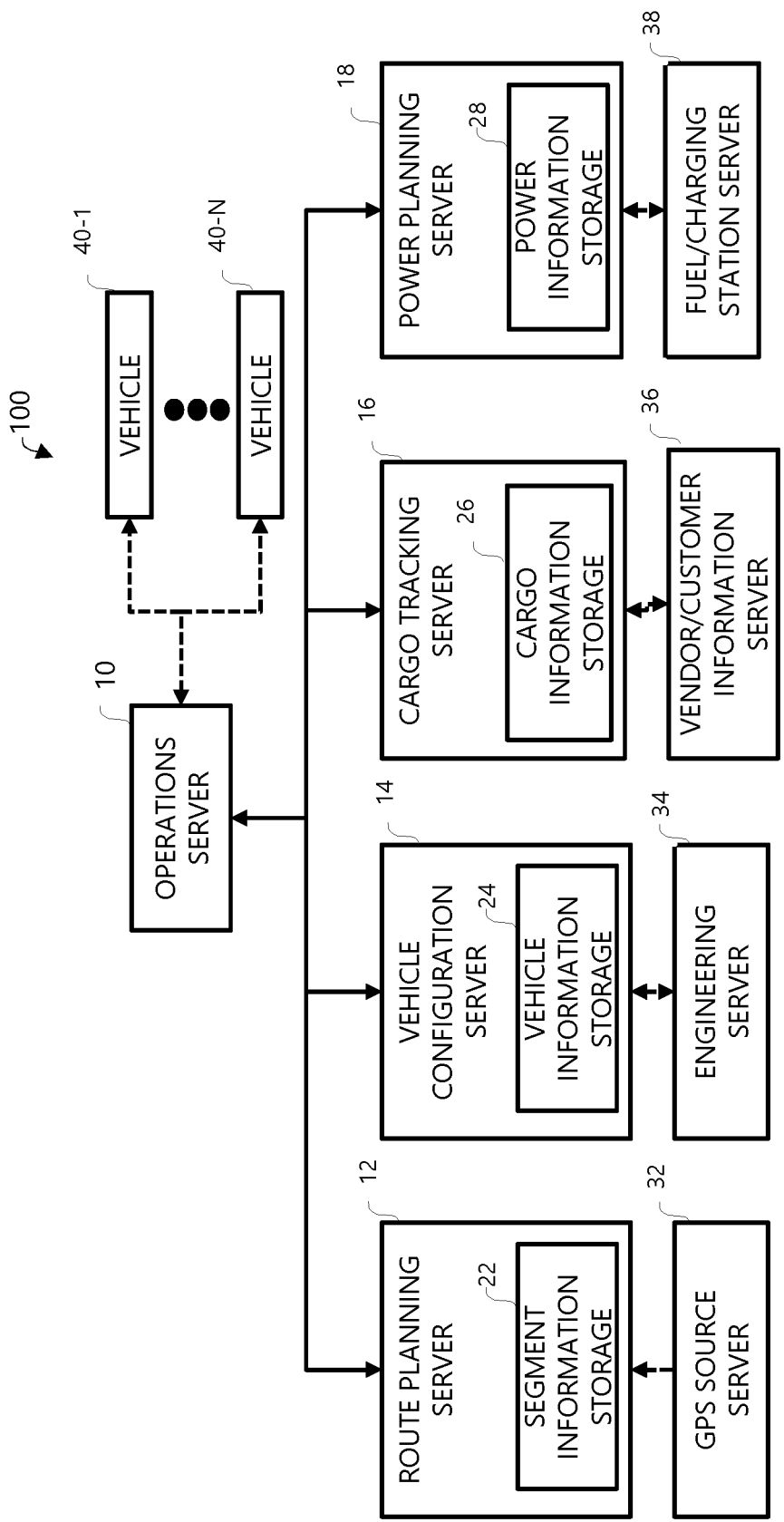
FIG. 1 depicts a block diagram of a system for adjusting operation of a drivetrain in a vehicle over a route.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, some embodiments are described as they pertain to a large, wheeled vehicle having a chassis with an all-electric drivetrain comprising a motor configurable as a motor or a generator, a battery system comprising a plurality of batteries and an e-axle coupled to the motor/generator. Some embodiments may be described as they pertain to a large, wheeled vehicle having a chassis with an electric drivetrain comprising a motor/generator configurable as a motor or a generator, a battery system comprising a plurality of batteries, an e-axle coupled to the motor/generator and an engine. The engine may be coupled to a second motor/generator, wherein the engine supplies rotational power to the second motor/generator to generate electric power to charge the batteries and/or provide electric power to the motor/generator. The engine may be coupled to a transmission coupled to a first drive axle a second motor/generator, wherein the drivetrain may be configurable for the engine to supply rotational power to the transmission to directly drive the wheels or supply rotational power to the second motor/generator to generate electric power to charge the batteries and/or provide electric power to the second motor/generator to drive the wheels. An engine control module (ECM) may receive inputs from a driver and adjust operation of the engine based on the input. A transmission controller may execute instructions to control operation of a transmission coupled to a drive axle. A motor controller may execute instructions to determine when to operate a motor/generator as a motor or operate the motor/generator as a generator. A battery management system may monitor a battery system to determine when the battery system can supply electric power to the motor/generator, when the battery system needs charging and when the battery system cannot or should not supply power (discharge) or receive electric power (charge). Embodiments may also pertain to any wheeled vehicles with two or more axles.

Particular embodiments may be best understood by reference to FIGS. 1-8, wherein like numbers are used to indicate like and corresponding parts.

System Overview

Turning now to the drawings, a system for managing performance of a vehicle 40 may include an operation server 10 communicatively coupled to route planning server 12, vehicle configuration server 14, cargo tracking server 16 and power planning server 18. Operation server 10 may also communicate with one or more vehicles 40 to receive information about a particular vehicle 40 and/or send a performance plan to the vehicle 40 to adjust an operating parameter of the vehicle 40. Communication between operation server 10 and vehicles 40, route planning server 12, vehicle configuration server 14, cargo tracking server 16 and power planning server 18 may be over a network.

Operation server 10 may process information associated with operations of vehicles 40 of an enterprise, including managing costs associated with transporting cargo loads and managing the delivery of cargo loads in the form of materials and supplies from a vendor and delivering end items and products to customers.

Route planning server 12 may communicate with operation server 10 to get route data about one or more routes for a vehicle 40. The route planning information may include a starting point and an end point for a vehicle 40. In some situations, a starting point for a route may be a location such as a central warehouse and an end point may be a retail location, but a vendor location may be a starting point for another route and the central warehouse may be the end point. Route planning server 12 analyzes route data to determine one or more routes over which vehicles 40 may travel from the starting point to the end point. Route planning server 12 may communicate with a global positioning system (GPS) source server 32 to retrieve route data, analyze the route data and store the analyzed route data in segment information storage 22. Route planning server 12 may communicate results of any analysis to operation server 10.

Vehicle configuration server 14 may communicate with operation server 10, engineering server 34 and vehicles 40 to get information about one or more vehicles 40. Vehicle configuration server 14 may communicate with engineering server 34 to get operating parameters for a vehicle 40 or type of vehicle 40. For example, for vehicles that have an engine, engineering server 34 may contain information about an engine output parameter for the engine or the type of engine, information about a service life for an engine or motor and engine emission levels for various operating conditions. Vehicle configuration server 14 may communicate with a particular vehicle 40 to get information about a drivetrain configuration in vehicle 40. In some embodiments, when a vehicle 40 starts, it communicates vehicle configuration information to vehicle configuration server 14. Vehicle configuration information may include information that does not change regularly, such as a vehicle base weight and a chassis type and may also include information that can change frequently, such as a fuel level and a battery state of charge (SOC). Vehicle configuration information may be stored in vehicle information storage 24.

Cargo tracking server 16 may communicate cargo load information to operation server 10. Cargo load information may include the type of cargo, a weight, any information specific to the cargo load (e.g., if a cargo load requires refrigeration, if there is hazardous material, if the cargo load must be delivered by a deadline, etc.). In some embodiments, a user may enter cargo load information for storing in cargo information storage 26. In some embodiments, cargo tracking server 16 may communicate over a network with vendor/customer information servers 36 associated with vendors, merchants, or other external parties to get cargo load information. Cargo tracking server 16 may store cargo load information in cargo information storage 26.

Power planning server 18 may communicate with operation server 10 to determine a route over which a vehicle 40 is expected to travel, identify a set of fuel stations and charging stations along the route and identify one or more locations where fuel may or should be acquired or charging should occur. In some embodiments, power planning server 18 may communicate over a network with fuel/charging station server 38 to get fuel/charging information associated with third parties (external sources) or associated with facilities (internal sources). Power planning server 18 may get information about fuel cost, a wait time for availability of a pump, a number of pumps at a fuel station, an electric power cost (including variations in charging cost due to peak demand, off demand, holiday and weekday or weekend rates), a wait time for availability for a charging station, a number of charging stations, a rate at which charging can occur and store the information in power information storage 28.

Operation server 10 may communicate with other systems as well. For example, operation server 10 may communicate with a warehouse server to determine how much time a vehicle 40 stays at the warehouse, communicate with a traffic server to identify traffic or traffic patterns, communicate with a weather server to get updates on weather, and communicate with a satellite imagery server to get information about a route.

In some embodiments, operation server 10 communicates instructions to one or more of route planning server 12, vehicle configuration server 14, cargo tracking server 16, power planning server 18, GPS source server 32, engineering server 34, vendor/customer information server 36 and fuel/charging station server 38 to collect information and operation server 10 may perform calculations on the collected information and execute processes for determining a drivetrain configuration and operating parameters for one or more vehicles 40 and communicate a drivetrain configuration and a set of operating parameters to each vehicle 40.

In some embodiments, operation server 10 may communicate instructions to one or more of route planning server 12, vehicle configuration server 14, cargo tracking server 16, power planning server 18, GPS source server 32, engineering server 34, vendor/customer information server 36 and fuel/charging station server 38 to perform calculations, execute processes for determining a drivetrain configuration and operating parameters for a vehicle 40, and communicating the drivetrain configuration and operating parameters for the vehicle 40 to operation server 10, wherein operation server 10 communicates the drivetrain configuration and a set of operating parameters to the vehicle 40.

A system 100 for managing performance of a vehicle 40 may communicate with a single vehicle 40 or a fleet of vehicles 40 to collect information about the vehicle and send a performance plan with an instruction to adjust one or more operating parameters of the vehicle 40 over a route or set of routes. A fleet may be as small as a single vehicle 40 but fleets may also have more than a hundred vehicles 40.

As described herein, adjusting an operating parameter of a vehicle 40 may be limited to generating a performance plan for adjusting a set of operating parameters of the vehicle 40. In some embodiments, a performance plan for a set of operating parameters of the vehicle 40 may specify an engine operating range, a maximum engine operating speed, a motor operating range, a maximum motor operating speed, a range of generator operating speeds, a maximum rate of generator operation, a range of battery charging, a maximum battery charging rate, a range of battery discharge rates, a maximum battery discharge rate, a minimum battery state of charge, a maximum battery state of charge and a maximum battery operating temperature. A set of operating parameters may include more or fewer operating parameters.

A performance plan communicated to a vehicle may provide general operating parameters but still allow a driver to drive the vehicle based on actual road conditions, traffic, visibility, weather, and other safety concerns. For example, a speed limit over a route may be 65 miles per hour and a vehicle 40 may be traveling over the route at 45 miles per hour because the driver has determined it is not safe to travel at 65 miles per hour (there may be bad weather, poor visibility, an accident, road maintenance, etc.). Embodiments may determine a drivetrain configuration of the vehicle 40 based on the current vehicle speed of 45 miles per hour and generate a performance plan with a set of operating parameters for the vehicle 40, but do not send any instructions to accelerate the vehicle 40.

Figure 2:
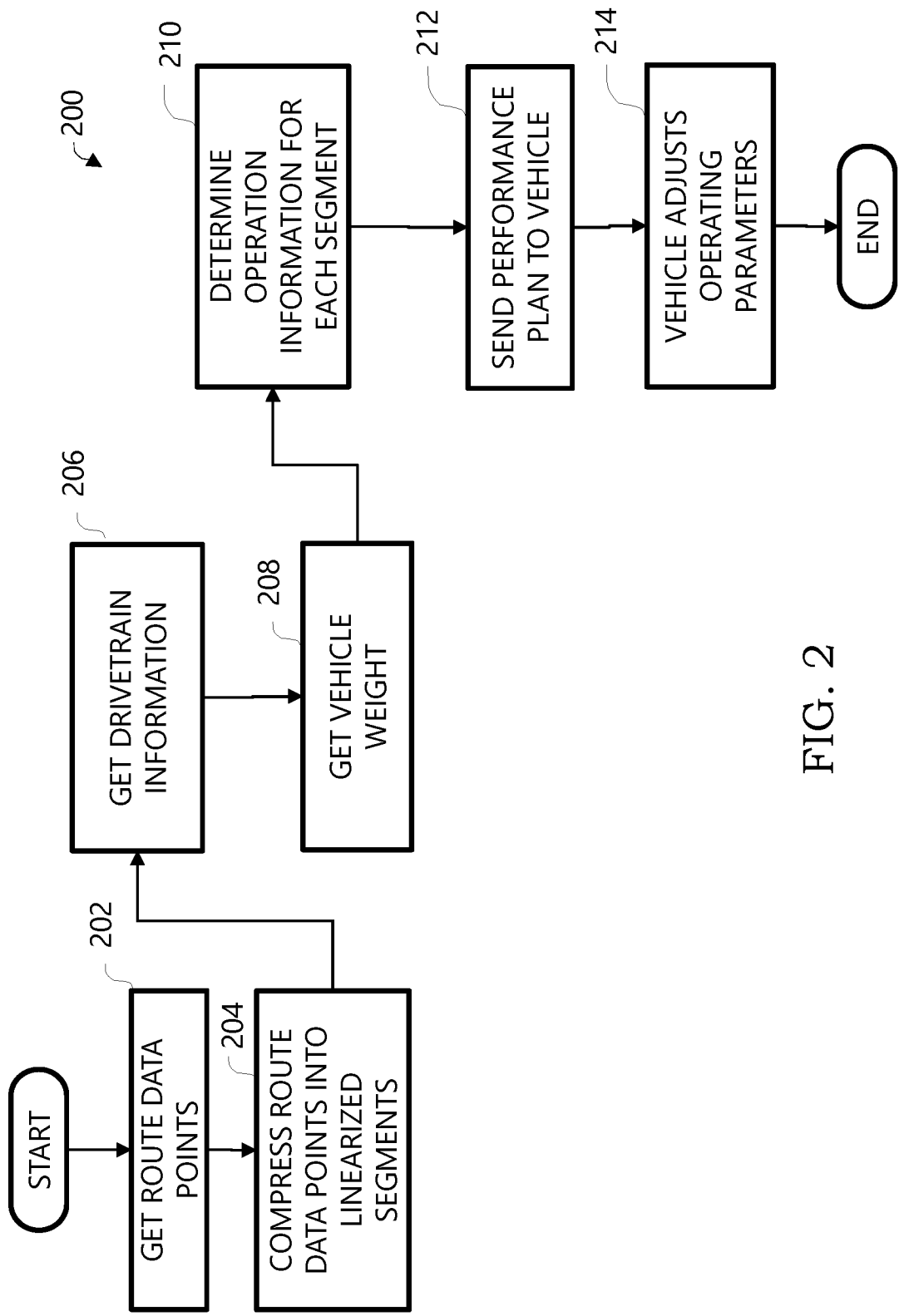
FIG. 2 depicts a flow diagram illustrating a method for adjusting operation of a drivetrain in a vehicle over a route.

FIG. 2 depicts a flow diagram illustrating a method for generating a performance plan to a vehicle 40.

At step 202, embodiments get route data points. Route data points may be retrieved from an outside source (such as by route planning server 12 communicating with a global positioning satellite (GPS) source server 32) and may contain a large plurality of route data points. In some embodiments, route data points for a route over which a vehicle is expected to travel may be collected from one or more vehicles 40 that previously traveled over the route. In some embodiments, route data points may be stored in route planning server 12. FIG. 3 (discussed in greater detail below) depicts a data structure containing route data points.

At step 204, embodiments compress route data points into linearized segments. A method for compressing route data points is discussed in greater detail below. FIG. 4 (discussed in greater detail below) depicts a data structure containing segment information.

Figure 5:
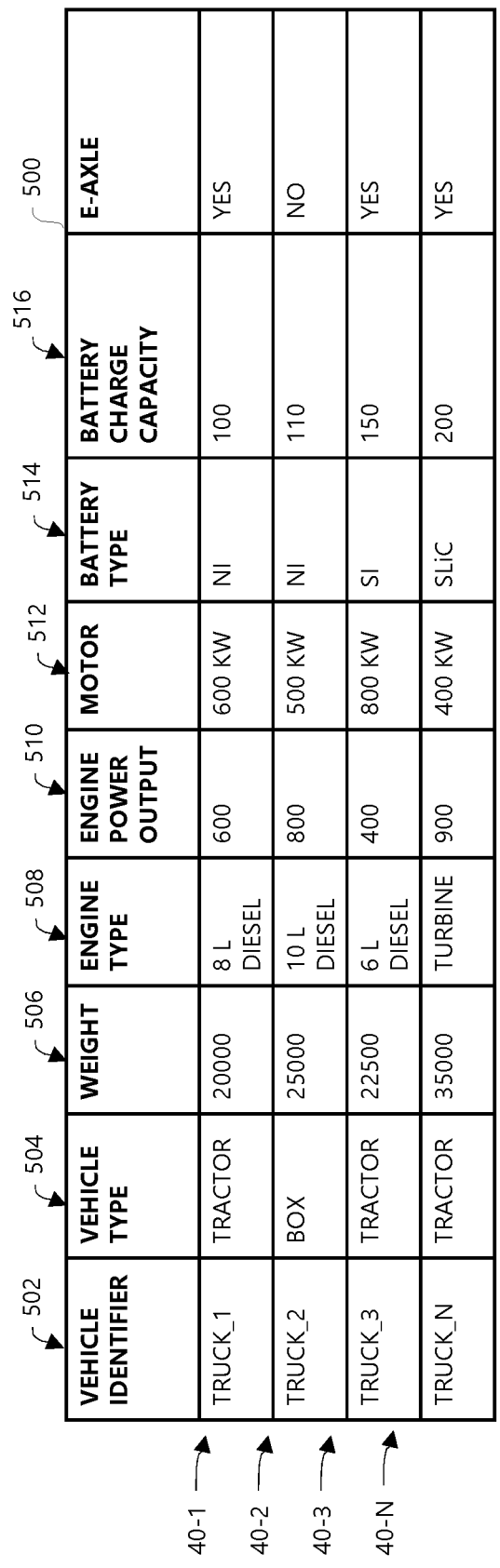
FIG. 5 depicts a data structure containing vehicle configuration information.

At step 206, embodiments get drivetrain information. FIG. 5 (discussed in greater detail below) depicts a data structure containing vehicle information including drivetrain configuration information. As used herein, drivetrain configuration information refers to what components are installed on the vehicle. For example, drivetrain configuration may include information that a drivetrain includes an engine having a particular displacement (e.g., 8.2 L), capable of providing a particular output power (e.g., 400 kW) and using a particular type of fuel (e.g. diesel).

At step 208, embodiments get vehicle weight.

Figure 6:
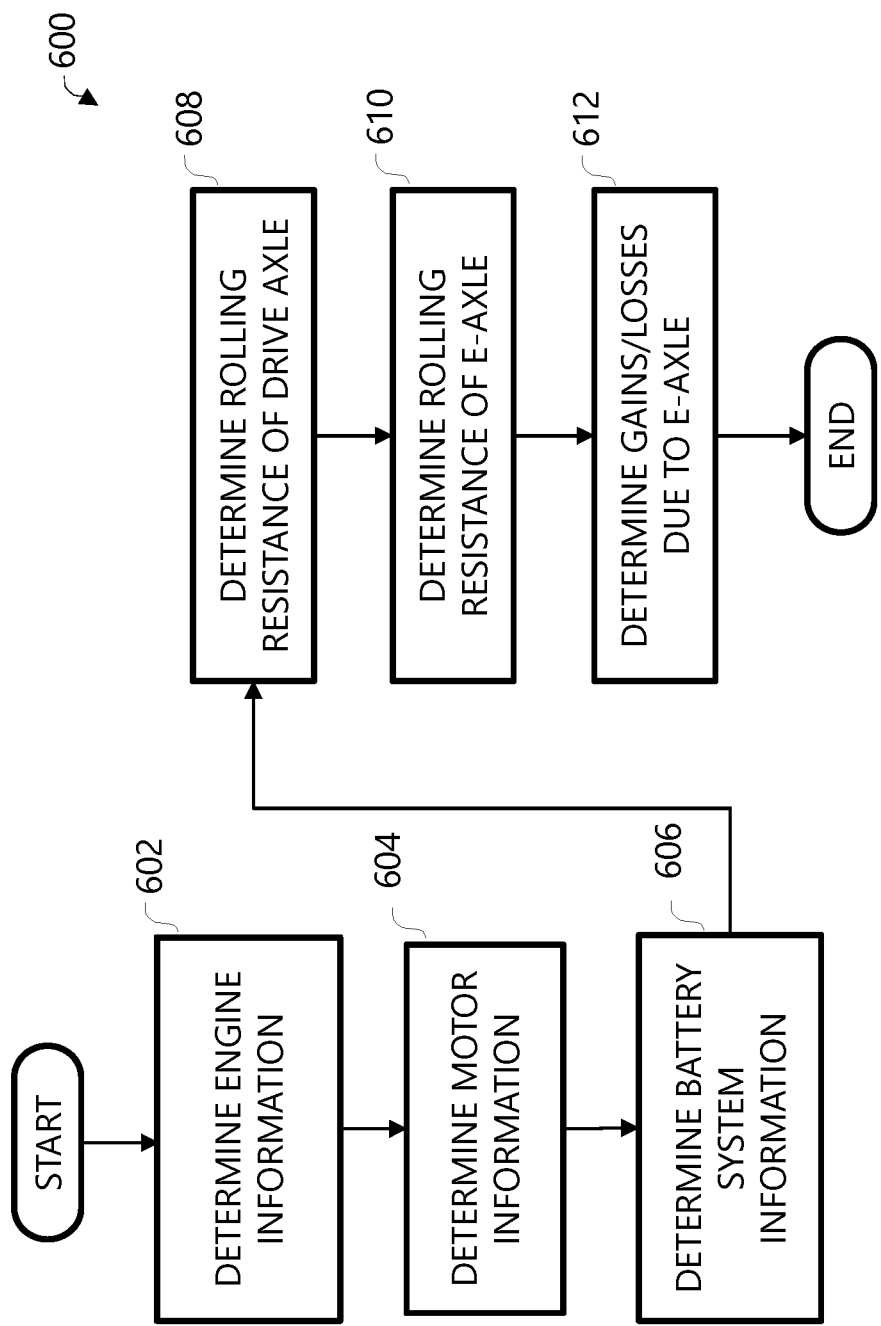
FIG. 6 depicts a flow diagram illustrating a method for determining operating resistance for a drivetrain.
Figure 8:
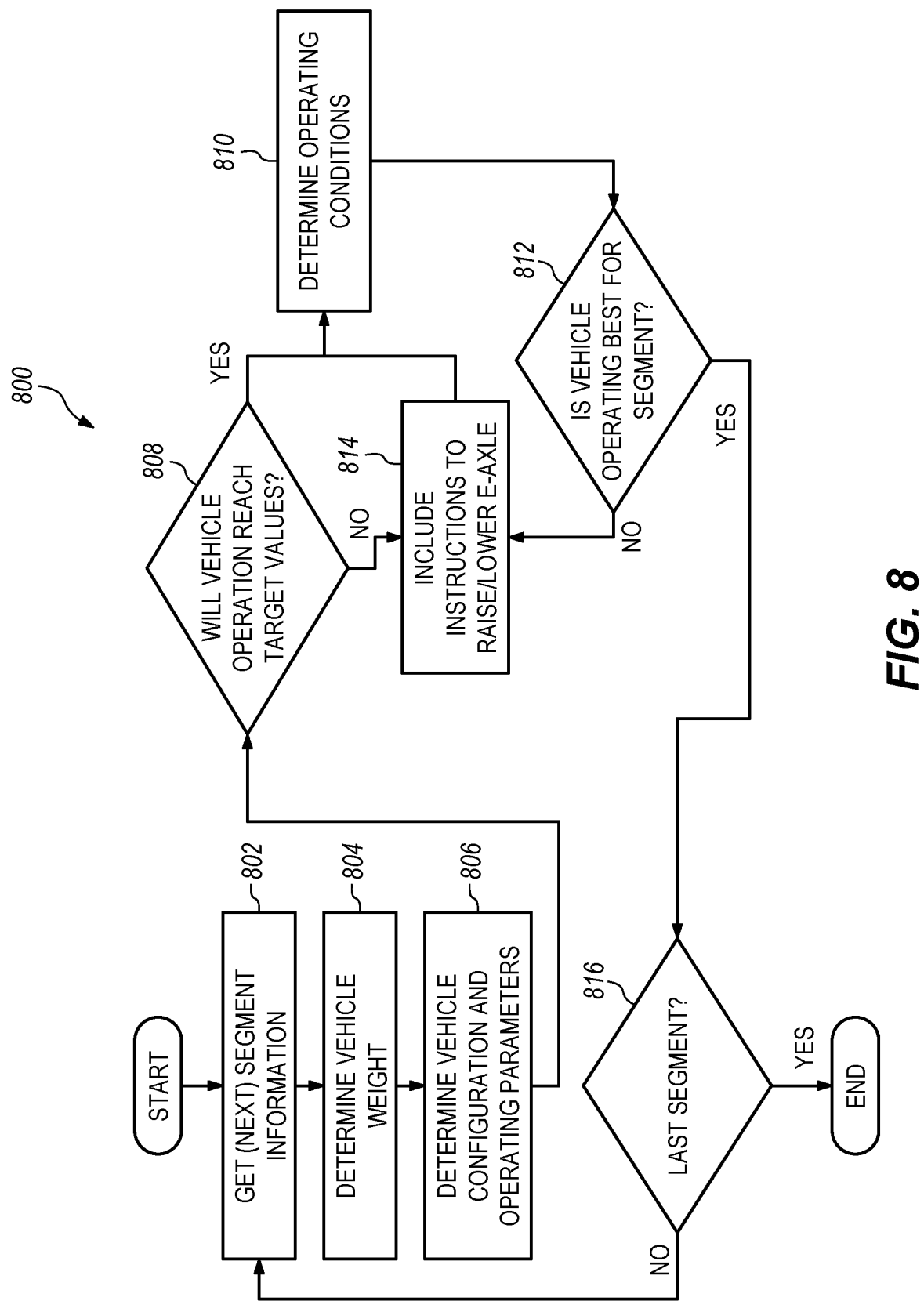
FIG. 8 depicts a flow diagram of a method for generating a performance plan for controlling a vehicle or plurality of vehicles based on a route and vehicle configuration information.

At step 210, embodiments determine operation information for a segment. As used herein, operation information refers to how the drivetrain is operating to drive the vehicle over a route and may include information such as a particular engine speed (e.g., 2100 RPM) or power capacity (e.g. 60% peak power) the engine is operating at or a particular amount of power (e.g., 245 kW) the engine is generating. FIGS. 6 and 8 (discussed in greater detail below) depict flow diagrams illustrating steps in a method for determining operation information.

At step 212, embodiments send a performance plan to the vehicle 40. FIG. 9 (discussed in greater detail below) depicts a data structure containing example performance plan information for a vehicle 40 traveling over a route.

At step 214, a vehicle 40 receives the performance plan and adjusts operation of the drivetrain based on the segment and the operating plan.

Additional details of the steps depicted in FIG. 2 are described below in greater detail.

Route Data Points

Referring to FIG. 3, data structure 300 comprises a plurality of route data points 320, which may be collected in step 202 of FIG. 2. Data structure 300 comprises a plurality of data points 320 for a route over which vehicle 40 is expected to travel. Data structure 300 may store, for each route data point 320, a route point identifier (ID) 302 and a set of coordinates including a latitude 304, a longitude 306 and an elevation 308. Route data points 320 retrieved from a GPS source server 32 are generally accurate to within 10 meters (33 feet) or less with a 95% probability. However, as the route distance increases, the number of route data points 320 increases immensely. For example, in one sample case of a 25-mile route, a data structure 300 included 4082 route data points 320. Any calculations using large numbers of route data points 320 would require immense processing including resources and time such that the calculations quickly become too complex and computationally expensive for effectively managing performance of a vehicle 40 traveling along a route.

Furthermore, elevation data along routes is noisy and there are places where elevations are clearly incorrect, such that the resulting grade of the road would exceed any actual grade found on roads. For example, route data point 320-3 identified as point ID_3 has a higher elevation than adjacent route data points 320-2 and 320-N (and has the highest overall elevation of 430 ft) and route data point 320-2 has a lower elevation than adjacent route data points 320-1 and 320-3. From these route data points 320, it is difficult to discern which (if any) route data point 320 is the highest point, which route data point 320 is the lowest point, and whether route data points 320-1 to 320-N represent an uphill portion, a downhill portion or a flat portion of the route.

Route Compression into Linearized Segments

Referring to step 204 in FIG. 2, embodiments may compress route data (such as data points 320 stored in data structure 300) into linearized segments (discussed in greater detail below), wherein each segment is defined with a segment distance greater than a minimum segment distance and a grade between a segment start point and a segment end point.

In a typical route, the number of data points corresponding to different uphill segments, downhill segments and flat segments will vary. Thus, each segment generated by compressing the route data may have a different segment distance and will have a grade that is different from a preceding or following segment. Each segment will also start at a unique distance from the start of the route.

FIG. 4 depicts data structure 400 comprising segment information for a plurality of segments 420 based on route data points 320 from data structure 300. Data structure 400 may contain segment information derived from linear compression of thousands of data points 320 and analyzed to identify uphill segments, downhill segments, and flat segments. Data structure 400 may store, for each segment 420, a segment identifier (SID) 402, a segment start point 404 indicating which route data point 320 is at the beginning of the segment 420, a segment end point 406 indicating which route data point 320 is at the end of the segment 420, a grade 408, a segment distance 410 and a distance from the starting point of the route to the starting point of the segment 420. For example, segment 420-1 may be identified as segment ID (or SID) 1, start at route data point 1 (PID1), end at route data point 24 (PID24), have a grade of 3, a route distance of 4.5 miles, and start at 0 miles from the start of the route.

Data structure 400 may contain other information as well. For example, data structure 400 may contain, for each segment, route data points 320, a value (e.g., concrete, paved, gravel) associated with a segment surface condition 414, a value (e.g., urban, highway, rural) associated with a segment road type condition 416 and a value (e.g., yes or no) associated with a traffic condition 418. Values for each road condition can be updated as needed. For example, a value for traffic condition 418 can be updated to reflect when traffic is present or not and a value for segment road type condition 416 may be updated when a road is under construction. Values for other road conditions such as weather, the number of lanes on a road, a maximum load per axle, a radius of a curve in the road, and a maximum speed limit along the route may be included in data structure 400.

Referring to step 204 in FIG. 2, a method for compressing a route into linearized segments may comprise analyzing route data points (such as route data points 320 in data structure 300) to identify uphill, downhill, and flat segments.

Determining Uphill/Downhill Segments

Uphill segments are defined as segments of a route over which the average grade exceeds a minimum grade threshold and spans a segment distance greater than a defined minimum segment distance.

Starting at a first route point 320 at the beginning of the route, embodiments analyze adjacent route data points 320 for a potential start of an uphill segment. Any grade between adjacent route data points 320 that exceeds the minimum grade threshold for an uphill segment is a potential start of an uphill segment. A potential uphill segment is investigated to determine if it meets the minimum distance and grade requirements. Exceptions are identified for short segments between two route data points 320 where the grade falls below the minimum grade threshold. If the number of exceptions does not exceed a defined maximum number of exceptions, the investigation of this possible uphill segment continues. If the thresholds for grade and distance are satisfied and the allowed exception limit is not exceeded, an uphill segment has been identified.

The end of the identified uphill segment needs to be identified to complete the uphill segment. This is done by finding a consecutive span of the path where the average grade requirement is less than the minimum grade threshold. Once the end of an uphill segment has been determined, segment information is saved, and the search process continues from the route data point after the last route data point identified in the previous uphill segment. The uphill segment is saved with the distance from the start of the route to the starting segment route data point, the segment distance, the segment end point, and the segment average grade.

If a potential uphill segment fails to meet the requirements, route analysis continues from the route data point at which the potential uphill segment failed to meet the requirements.

Determining Downhill Segments

Downhill segments are defined as segments of a route over which the average grade is less than a defined downhill threshold and that span a segment distance greater than a defined minimum segment distance.

Starting at the first route data point of the route, embodiments analyze adjacent route data points for a potential start of a downhill. Any grade between adjacent route data points that is less than the downhill grade threshold for a downhill segment is a potential start of a downhill segment. An identified potential downhill is investigated further to determine if it meets the minimum distance and grade requirements. Exceptions are identified for short segments between two route data points 320 where the grade is above the minimum threshold.

If the number of exceptions does not exceed a defined maximum number of exceptions, the investigation of this hill continues. If the thresholds for grade and distance are satisfied and the allowed exception limit is not exceeded, a downhill has been identified.

The end of the confirmed downhill needs to be identified to complete the hill. This is done by finding a consecutive span that exceeds the average grade threshold. Once the downhill is ended it is saved and the search process continues from the point after the last point identified in the previous downhill.

The downhill segment is saved with the distance from the starting route data point 320 of the route to the segment start data point 320, the segment distance, the segment end data point, and the segment average grade.

If a potential downhill segment fails to meet the requirements, route analysis continues from the point at which the potential downhill failed to meet the requirements.

Determining Flat Segments

Flat segments may be defined as the segments of the route determined to not be an uphill segment or a downhill segment.

Initial Flat Segment

An initial flat segment may be determined by starting at the first route data point 320 at the beginning of the route and checking whether the current route data point 320 on the path is part of an uphill or downhill segment.

If the current route data point 320 is not part of an uphill or downhill segment, then the initial flat is determined by identifying the closest uphill or downhill starting point and selecting that route data point 320 as the ending route data point 320 for the flat segment.

Subsequent Flat Segments

Embodiments may identify a flat segment based on an uphill segment or downhill segment determined from the start of the route that is beyond the last route data point 320 of the last flat segment found.

The uphill or downhill segment is based on the shortest distance along the path to the start of the uphill or downhill. The last route data point 320 of an uphill segment or a downhill segment may be identified as the first route data point 320 of the flat segment if the next route data point 320 on the route is not part of an uphill or downhill segment.

Each flat segment spans from the last route data point 320 of an uphill segment or downhill segment to the first route data point 320 of the next uphill segment or downhill segment. Route analysis continues using the last route data point 320 of each uphill segment or downhill segment whose first route data point 320 was used as the last route data point 320 of the last flat found. The process is repeated until all the flat segments between uphill and downhill segments are found.

Terminal Flat Segment

Embodiments determine whether the last route data point 320 on the route is part of an uphill segment or downhill segment. If it is not part of an uphill segment or downhill segment, embodiments search back from the last route data point 320 for the uphill or downhill segment whose distance is furthest from the beginning of the route. The last route data point 320 on the uphill segment or downhill segment found above becomes the first route data point 320 of the terminal flat segment. The last route data point 320 of the route is the last route data point 320 of the terminal flat segment.

Each flat segment is saved with the first and last route data points 320 of the segment, distance from the start of the path, the grade of the flat segment and the flat segment span distance.

Once step 204 is completed, embodiments may use the linearized segments for determining a performance plan for a vehicle 40. For the example mentioned with respect to route data points 320 in FIG. 3, a data structure of 39 segments was developed to represent a 25 mile route having 4082 route data points, representing a 99% decrease in the number of calculations needed to perform additional processing.

Vehicles have Different Drivetrain Configurations

Segment information may be the same for all vehicles 40 traveling on the segment. However, different vehicles traveling on the same segment can have different drivetrain configurations such that no single performance plan is possible for all vehicles traveling the same segment.

FIG. 5 is a data structure 500 comprising vehicle information including drivetrain configuration information collected in step 206 for a plurality of vehicles, wherein each row 40 in data structure 500 depicts example drivetrain configuration information for a vehicle.

As depicted in FIG. 5, each vehicle 40 has a vehicle identifier 502, a vehicle type column 504 and a gross weight 506 (column 506). Data structure 500 may include other drivetrain configuration information.

Vehicle type 504 (column 504) may store information on a type of vehicle 40, such as whether the vehicle 40 is a tractor, a box truck, a bus, or some other type of vehicle 40.

Weight column 506 may comprise information about a weight of each vehicle 40.

Drivetrain configuration information for a vehicle may be retrieved from engineering server 34 and/or retrieved from the vehicle. Drivetrain configuration information may include information about an engine, a transmission, a motor/generator, a battery system, an e-axle, and other components forming part of a drivetrain in the vehicle. For example, drivetrain configuration information may include information about an engine such as the engine is an internal combustion engine with a 15-liter displacement and uses diesel fuel or the engine is a fuel cell that operates best at about 60% peak power capacity. Engine information may further include an engine map or other information related to the power output and efficiency of the engine. If a transmission is coupled to the engine, drivetrain configuration information for a transmission coupled to the engine may include information such as the number of gears, the gear ratio for each gear and an efficiency of the transmission. Drivetrain configuration information for a motor/generator may include the output power capacity and an efficiency associated with the motor/generator operating as a motor, as well as the input/power capacity and an efficiency associated with the motor/generator operating as a generator. Drivetrain configuration information for a battery system may include information such as a battery chemistry, a maximum SOC of the battery system, a maximum discharge rate, a maximum charge rate, and a maximum operating temperature of the battery system. Drivetrain configuration information for an e-axle may comprise a rolling resistance of the e-axle.

Engine type column 508 may comprise drivetrain configuration information such as a type of engine installed in each vehicle 40. Examples of engine types include an internal combustion (IC) engine (also referred to as an ICE) that may be configured to operate using gasoline, diesel, natural gas (NG) including compressed natural gas (CNG), liquid natural gas (LNG) and renewable natural gas (RNG), or other types of engines including, but not limited to gas turbines and fuel cells, which may operate on hydrogen, natural gas, propane, dimethyl ether (DME) or some other fuel source.

Engine power output column 510 may comprise drivetrain configuration information such as how much power can be supplied by the engine type provided in engine type column 508.

Motor column 512 may comprise drivetrain configuration information such as how much power can be supplied by the motor.

Battery type column 514 may comprise information about what type of battery system is installed in each vehicle 40. Battery chemistry may differ between battery systems in vehicles 40. Battery charge capacity column 516 may comprise information about a battery capacity for a battery system installed in each vehicle 40. Improvements in battery chemistry and packaging may allow increased battery capacity.

E-axle column 518 may comprise drivetrain configuration information such as the state of an e-axle. The information may include whether the e-axle is in an up position or a down position.

Other columns with additional information may be stored in data structure 500. For example, data structure 500 may store information related to a maximum allowable weight per axle allowed on each vehicle 40.

Vehicle configuration information may be stored in vehicle information storage 24. In some embodiments, operation server 10 may communicate with engineering server 24 and/or vehicles 40 to get vehicle configuration information. For example, operation server 10 may communicate with engineering server 24 to get information about a type of battery in a particular vehicle 40 and communicate with a particular vehicle 40 to get about that particular vehicle 40 including a fuel efficiency associated with an engine providing only rotational power to the one or more axles, a fuel efficiency associated with an engine providing rotational power to the one or more axles and providing rotational power to a motor/generator to generate electric power, and a fuel efficiency associated with the engine providing only rotational power to the motor/generator to generate electric power. Operation server 10 may store information (or be communicatively coupled to a storage device that stores information) such as a maximum allowable weight per axle and a maximum allowable weight on an e-axle.

Regenerative braking through an e-axle may be used to charge a battery system in a vehicle. For long haul routes, there might not be a high percentage of stopping and starting. As such, most of the battery recharging must occur through regenerative braking based on the terrain. During extremely flat stretches of terrain, there might not be any hills large enough to recharge the hybrid system. For these flat stretches, it is imperative that all parasitic losses are reduced to a minimum. A few ways that this can be achieved is: 1) Turn off all High Voltage (HV) and Low Voltage (LV) components of the hybrid system (which may be estimated to save between 0.1-0.4% of losses); 2) Turn off all IGBT's within the motor controller (which may be estimated to save 0.5% of losses); 3) Disengage the e-Motor with a neutral gear in the rear axle. (which may be estimated to save 0.5% of losses); 4) Disengage the rear differential gear friction. (which may be estimated to save 1% of losses); 5) Have a dynamic tag e-axle that automatically lifts when the look ahead terrain indicates that it would be more advantageous to pull up the axle over the next x miles of terrain. (which may be estimated to save up to 5% of losses).

If the truck payload is light enough, embodiments may determine, based on look ahead algorithms, when it is advantageous to have the rear axle lifted (e.g. when a vehicle is light and traveling on very flat terrain or turning at low speeds). Embodiments may then automatically lift the e-axle during these flat terrain areas, ideally at high speed (although, if regulations require that the axle is not lifted at >20 mph, for example, then embodiments may alert the driver to slow down enough to allow the automatic tagging to occur).

Referring to FIG. 6 and step 210 in FIG. 2, controlling operation of a drivetrain for each segment 420 that a vehicle is expected to travel on may include determining operating information of a drivetrain including values of operating parameters of an engine or transmission (if present), motor/generator and battery system and calculating, based on the weight of the vehicle (including a weight per axle or a weight supported by the e-axle), the drivetrain configuration and the segment grade, gains or losses in vehicle efficiency due to the e-axle being in the up position and being in the down position. For example, a vehicle may have just completed a downhill segment in which the engine was turned off and an e-axle was in a down position to capture regenerative electric power such that the vehicle efficiency is high and the e-axle could have provided extra braking if needed. As the vehicle transitions from the downhill segment to traveling on a flat segment in which maintaining the e-axle in the down position results in parasitic losses that reduce the vehicle efficiency and the mechanical braking system is able to provide adequate braking forces if needed, there is an opportunity to increase overall vehicle efficiency by raising the e-axle.

At step 602, embodiments determine operating information for an engine. Determining operating information for the engine may include determining if the engine is off or on and, if the engine is on, determining an engine output power, a fuel level, an emissions output power level, an engine efficiency, and other information related to the performance of the engine in the drivetrain configuration while traveling on the route. In some embodiments, a vehicle 40 may comprise an all-electric drivetrain such that no engine is present. In these cases, a drivetrain may have a first e-axle coupled to a first motor/generator and a second e-axle coupled to a second motor/generator. In these cases, step 602 may comprise determining operating parameters for the first motor/generator or determining operating parameters for the battery system supplying electric power to a single e-axle.

At step 604, embodiments determine operating information for the motor/generator. Determining operating information for the motor/generator may include determining if the motor/generator is operating (rotating) or off (not rotating) and, if the motor is operating, determining if the motor is operating as a motor or a generator. If the motor/generator is operating as a motor, determining operating information for the motor may include determining a motor output power and motor output efficiency. If the motor/generator is operating as a generator, determining operating information for the motor may include determining how much electric power the generator is generating and a generator input efficiency. Determining operating information for the motor may include determining other information related to the performance of the motor/generator in the drivetrain configuration while traveling on the route.

At step 606, embodiments determine operating information for the battery system. Determining operating information for the battery system may include determining if the battery system is charging or discharging. If the battery system is charging, determining operating information for the battery system may include determining a battery state of charge (SOC), a rate at which the SOC is increasing, a temperature of the battery system and a rate at which the battery temperature is increasing. If the battery system is discharging, determining operating information for the battery system may include determining the SOC, a rate at which the SOC is decreasing, a temperature of the battery system and a rate at which the battery temperature is increasing.

At step 608, embodiments determine a rolling resistance of the drive axle. The rolling resistance of a drive axle may include the rolling resistance of the wheels coupled to the drive axle and any losses associated with rotating the drive axle. Losses may include gear losses, windage losses and losses associated with a clutch mechanism coupled to the drive axle. Determining a rolling resistance of the drive axle may be performed when the e-axle is in an up position. If the e-axle is in an up position and an engine is supplying rotational power, determining a rolling resistance of the drive axle may include determining a grade for the segment on which the vehicle is traveling, determining output power generated by the engine, and determining fuel efficiency of the engine for the segment. If the e-axle is in the down position, determining a rolling resistance of the drive axle may include determining a grade for the segment on which the vehicle is traveling, disengaging the drive axle from the engine, and determining an efficiency of the motor for the segment.

At step 610, embodiments determine a rolling resistance of an e-axle. The rolling resistance of an e-axle may include the rolling resistance of the wheels coupled to the e-axle and any losses associated with rotating a motor/generator coupled to the e-axle. Determining a rolling resistance may include determining if the e-axle is in the up position or the down position. If the e-axle is in an up position, there is no rolling resistance. If the e-axle is in the down position, determining a rolling resistance of the e-axle may include determining a grade for the segment on which the vehicle is traveling and determining if a motor is supplying rotational power to the e-axle or an engine is supplying rotational power to the drive axle.

If the e-axle is in the down position, the drive axle is engaged with an engine and the motor/generator is not supplying rotational power to the e-axle, determining a rolling resistance of the e-axle may comprise determining, based on the engine output power and efficiency, that the engine is operating at a lower output efficiency associated with overcoming parasitic losses of the e-axle for the segment grade.

If the e-axle is in a down position, determining a rolling resistance of the e-axle may include determining a grade for the segment on which the vehicle is traveling, determining if an engine is supplying rotational power, and determining an efficiency of the engine for the segment.

At step 612, embodiments determine gains and losses associated with the e-axle being in the down position. Determining gains and losses may include determining if the e-axle is in an up position or a down position. If the e-axle is in an up position, there is no rolling resistance (loss) but there is no ability to generate electric power (gain). If the e-axle is in a down position, the e-axle might be used to generate (gain) electric power or result in parasitic losses. Determining gains and losses due to the e-axle may include determining a grade for the segment on which the vehicle is traveling, determining if a motor coupled to the e-axle battery is supplying rotational power, and determining a battery state of charge (SOC) is decreasing at a rate associated with overcoming parasitic losses of the e-axle for the segment grade.

FIG. 7 depicts a data structure 700 that may be generated to determine when operation of the drivetrain in a vehicle should be adjusted. As depicted in FIG. 7, each row 720 represents values for operating parameters 704 of the same drivetrain configuration traveling over the same segment of a route. For each case, the drivetrain may comprise an engine mechanically coupled to a drive axle coupled to a first drive axle, wherein the first drive axle and the e-axle form the two rear axles in the vehicle. The drivetrain may also comprise two e-axles, wherein each e-axle is coupled to a motor/generator, wherein one e-axle can be raised or lowered as a dynamic tag e-axle.

Row 720-1 represents operation of a drivetrain in which an engine is on and operating to drive the vehicle, the e-axle is in the down position and the motor/generator is operating as a generator to capture regenerative power. A value of "ON" for engine state 704-1 indicates the engine is operating, a value of "1500" for engine RPM 704-2 indicates the engine is operating at 1500 RPM, a value of "300" for engine output power 704-3 indicates the engine is generating 300 kW of output power, a value of "DOWN" for e-axle position 704-4 indicates the e-axle is in the down position, a value of "G" for motor/generator (M/G) state 704-5 indicates the motor/generator is operating as a generator, a value of "+15" for M/G input/output power 704-6 indicates the motor/generator is generating 15 kW/hr. of electrical power, a value of "3%" for losses due to e-axle 704-7 indicates the e-axle being in the down position results in 3% losses and a value of "82%" for drivetrain efficiency 704-8 indicates the drivetrain is operating at 82% efficiency.

Row 720-2 represents operation of a drivetrain in which an engine is on and operating to drive the vehicle, an e-axle is in the down position, but the motor/generator is off. A value of "ON" for engine state 704-1 indicates the engine is operating, a value of "1450" for engine RPM 704-2 indicates the engine is operating at 1450 RPM, a value of "290" for engine output power 704-3 indicates the engine is generating 290 kW of output power, a value of "DOWN" for e-axle position 704-4 indicates the e-axle is in the down position, a value of "OFF" for motor/generator (M/G) state 704-5 indicates the motor/generator is turned off, a value of "0" for M/G input/output power 704-6 indicates the motor/generator is not generating electrical power, a value of "3%" for losses due to e-axle 704-7 indicates the e-axle being in the down position results in 3% losses and a value of "84%" for drivetrain efficiency 704-8 indicates the drivetrain is operating at 84% efficiency.

Row 720-3 represents operation of a drivetrain in which an engine is operating to drive the vehicle and the e-axle is in the up position. A value of "ON" for engine state 704-1 indicates the engine is operating, a value of "1350" for engine RPM 704-2 indicates the engine is operating at 1350 RPM, a value of "290" for engine output power 704-3 indicates the engine is generating 290 kW of output power, a value of "UP" for e-axle position 704-4 indicates the e-axle is in the up position, a value of "OFF" for motor/generator (M/G) state 704-5 indicates the motor/generator is not operating, a value of "0" for M/G input/output power 704-6 indicates the motor/generator is not using or generating electrical power, a value of "0" for losses due to e-axle 704-7 indicates the e-axle being in the up position results in no losses and a value of "87%" for drivetrain efficiency 704-8 indicates the drivetrain is operating at 87% efficiency.

Row 720-4 represents operation of a drivetrain in which an engine is turned off, the e-axle is in the down position and the motor/generator is operating as a motor to supply rotational power to the e-axle to drive the vehicle. A value of "OFF" for engine state 704-1 indicates the engine is turned off, a value of "0" for engine RPM 704-2 indicates the engine is not operating, a value of "0" for engine output power 704-3 indicates the engine is not generating output power, a value of "DOWN" for e-axle position 704-4 indicates the e-axle is in the down position, a value of "M" for motor/generator (M/G) state 704-5 indicates the motor/generator is operating as a motor, a value of "−80" for M/G input/output power 704-6 indicates the motor/generator is using 80 kW/hr. of electrical power, a value of "2%" for losses due to e-axle 704-7 indicates the e-axle being in the down position and the motor/generator operating as a motor results in 2% losses and a value of "86%" for drivetrain efficiency 704-8 indicates the drivetrain is operating at 86% efficiency.

Row 720-5 represents operation of a drivetrain in which an engine is turned on to supply rotational power to a second motor/generator to generate electrical power, the e-axle is in the down position and the motor/generator is operating as a motor to supply rotational power to the e-axle to drive the vehicle. A value of "ON" for engine state 704-1 indicates the engine is on, a value of "800" for engine RPM 704-2 indicates the engine is operating at 800 RPM, a value of "50" for engine output power 704-3 indicates the engine is generating 50 kw/hr. of output power, a value of "DOWN" for e-axle position 704-4 indicates the e-axle is in the down position, a value of "M" for motor/generator (M/G) state 704-5 indicates the motor/generator is operating as a motor, a value of "−80" for M/G input/output power 704-6 indicates the motor/generator is using 80 kW/hr. of electrical power, a value of "2%" for losses due to e-axle 704-7 indicates the e-axle being in the down position and the motor/generator operating as a motor results in 2% losses and a value of "88%" for drivetrain efficiency 704-8 indicates the drivetrain is operating at 88% efficiency.

A comparison of the values of drivetrain efficiency 704-8 indicates operating the drivetrain according to row 720-5 (i.e., disengaging the drive axle from the engine, lowering the e-axle to the down position, operating the motor/generator as a motor and operating the engine to generate electrical power) results in the drivetrain operating at the highest efficiency for the vehicle having that weight and traveling over that segment. Notably, although operating the drivetrain according to row 720-1 results in the lowest drivetrain efficiency, the battery system is being charged such that the lower drivetrain efficiency may be acceptable.

FIG. 8 depicts a flow diagram of a method 800 for determining a performance plan for a vehicle. Portions of method 800 may be performed by a system 100 for managing performance of a vehicle or the vehicle itself. For example, a system 100 for managing performance of a vehicle may collect information and determine a performance plan for a vehicle before the vehicle starts traveling along a route. As the vehicle travels along the route, the vehicle may communicate with operation server 10 to get updates to the performance plan. Using this approach, performance of the vehicle may be fine-tuned to meet the needs of a particular vehicle traveling on a particular route. For example, if a road surface was recently resurfaced such that the rolling resistance has changed, embodiments may adjust the performance plan for that vehicle (and any vehicles subsequently traveling along the same route).

At step 802, embodiments may determine a segment for a vehicle. The segment may be a segment that a vehicle is currently on or may be based on a route that a vehicle will be traveling on.

At step 804, embodiments determine vehicle weight. Determining vehicle weight may include determining a base vehicle weight (such as by accessing information stored in engineering server 34 or vehicle information storage 24) and adding any cargo weight.

At step 806, embodiments determine a vehicle configuration and values of a set of operating parameters. Determining a configuration may include determining whether an engine is operating, whether a motor is operating as a motor or a generator, whether batteries are charging or discharging, and whether an e-axle is in an up position or a down position.

At step 808, embodiments determine if operating the vehicle according to the set of operating parameters will reach a set of target values. Determining if the vehicle operation will reach a set of target values may include calculating a set of drivetrain efficiencies for the vehicle based on the engine operating to drive the vehicle and/or charge the battery system or not operating, the e-axle being in the up position to avoid parasitic losses or in the down position, the motor operating as a motor to supply rotational power to the e-axle or operating as a generator to generate electrical power from rotational power supplied by the engine or by regenerative capturing, for example.

For example, for a vehicle with a lighter weight (e.g., 20,000 pounds) traveling on a flat segment with an e-axle in a down position, embodiments may determine, based on parasitic losses associated with the e-axle being in the down position, that operating a vehicle with a particular drivetrain configuration will result in low drivetrain efficiency. For example, embodiments may determine a vehicle is traveling on a curvy route at a low speed and that scrubbing will occur when the vehicle turns, reducing the overall efficiency of the vehicle. Embodiments may determine that the parasitic losses can be avoided by raising the e-axle for that segment.

For the same vehicle 40 with the same weight (e.g., 20,000 pounds) traveling on a steeper downhill segment, embodiments may determine that operating the drivetrain with the e-axle in the down position and the motor/generator coupled to the e-axle and operating as a generator to charge the battery system can generate electric power and may lower the e-axle to the down position for that segment.

At step 810, embodiments may determine a set of operating conditions. A set of operating conditions may include weather, traffic, road conditions associated with the segment.

At step 812, embodiments may determine if the vehicle is operating best for the segment. For example, for the same vehicle with the same weight (e.g., 20,000 pounds) traveling on a less steep downhill segment, embodiments may determine that operating the drivetrain with the e-axle in the down position and the motor/generator operating as a generator might not generate a significant amount of electric power but determine that lowering the e-axle may be needed to supplement mechanical braking and therefor increase safety for that segment. Alternatively, embodiments may determine that operating the vehicle with the e-axle in the up position will result in more weight on another axle, which may be a better configuration to prevent slipping.

For a vehicle with a different drivetrain configuration or a heavier weight (e.g., 60,000 pounds) traveling over the same route, embodiments may determine a different set of segments in which the e-axle should be lowered or raised.

Determining operation of a drivetrain configuration may include determining whether an engine should be on or off, whether the engine should be engaged to a drive axle to drive the wheels directly or drive a motor operating as a generator to supply electric power to the battery system, whether the e-axle should be in the up position or the down position and whether the motor should operate as a motor to drive the e-axle or operate as a generator to charge the battery system.

If the vehicle is operating best for the segment, embodiments monitor the operating parameters to confirm the vehicle is operating properly and in the best configuration.

Performance Plans Sent to Different Vehicles are Based on Ensuring Each Vehicle Drivetrain is Capable of Completing its Intended Route Referring to step 212 of FIG. 2, embodiments send a performance plan to a vehicle 40. FIG. 9 is a data structure 900 depicting example vehicle performance plan information in table format. Using the methods described above with the data stored in one or more data structures described above, embodiments may determine a performance plan for different segments 906 for a vehicle 40 or a plurality of vehicles 40.

A performance plan may specify a set of operating parameters for a vehicle 40 with a particular configuration comprising an engine, a motor configurable as a motor or a generator, a battery system, and an e-axle. FIG. 9 depicts a data structure 900 storing a performance plan for a vehicle and a particular route. A performance plan may comprise a set of operating parameters for each segment 906. It should be noted that the number of segments 906 for each vehicle 40 may vary. Furthermore, each performance plan depends on a vehicle configuration. Thus, even if two vehicles 40 are traveling over the same route, a first vehicle 40-1 may receive a different performance plan than a second vehicle. A performance plan may specify which segments a vehicle 40 should use an engine to generate rotational power to drive the vehicle 40 (e.g., segments 906-1 and 906-N), use a motor as a motor to supply rotational power to the e-axle (e.g., segments 906-2 and 906-N), use a motor as a generator to capture regenerated power (e.g., battery power supplied from a battery system to operate a motor to drive the vehicle 40, which segments a vehicle 40 should use battery power supplied from a battery system to operate a motor and, which segments a vehicle 40 should use regenerative braking to charge a battery system, which segments a vehicle 40 should use regenerative braking to charge a battery system and brake the vehicle, which segments a vehicle 40 should coast, which segments a vehicle 40 should operate to cool the battery system. In some embodiments, a performance plan for each segment 906 may specify one or more of an engine operating parameter or a range of operating parameters, a vehicle speed range or a maximum vehicle speed, a motor operating parameter or a range of motor operating parameters, a generating operating parameter or a range of generator operating parameters, a battery state of charge (SOC), a minimum battery SOC at the beginning or end of a segment, a maximum battery SOC at the beginning or end of a segment, a maximum rate of charging the battery system, a minimum fuel level at the beginning or end of the segment, a minimum fuel efficiency while operating in the segment, a maximum emission output while operating in the segment or some other operating parameter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for adjusting operation of a vehicle traveling along a route, comprising:
   determining segment information of a segment of a route of a vehicle;
   determining a weight of the vehicle;
   determining a vehicle drivetrain configuration and current values for a set of operating parameters of the vehicle;
   determining, based on the vehicle drivetrain configuration, that the vehicle operation according to the current values for the set of operating parameters will not reach a set of target values for the segment, wherein the set of target values are based on a performance plan for the vehicle traveling along the route; and
   in response to determining that the vehicle operation will not reach the set of target values for the segment, operating an e-axle of the vehicle to an up position or a down position, wherein operating the e-axle to the down position causes a set of wheels coupled to the e-axle to contact a road surface, and operating the e-axle to the up position causes the set of wheels coupled to the e-axle to not contact the road surface.

2. The method of claim 1, further comprising:
   determining a set of operating conditions associated with the segment information of the route;
   determining that the e-axle is in a suboptimal position based on the set of operating conditions, the vehicle drivetrain configuration, and the segment information; and
   operating the e-axle of the vehicle into the up position or the down position in response.

3. The method of claim 2, wherein the set of operating parameters comprises weather, traffic, and road conditions associated with the segment.

4. The method of claim 1, wherein the vehicle weight is determined by determining a base vehicle weight and cargo weight of the vehicle.

5. The method of claim 1, wherein determining whether the vehicle operation reaches the set of target values comprises calculating a set of drivetrain efficiencies for the vehicle based on: an engine operating or not operating to drive the vehicle and charge a battery system, e-axle being in an up position or a down position, motor operating as a motor to supply rotational power to the e-axle or operating as a generator to generate electrical power from rotational power supplied by an engine or by regenerative capturing.

6. The method of claim 1, wherein determining the current values for the set of operating parameters comprises determining whether operating an engine to on or off, whether the engine is engaged to a drive axle to drive the set of wheels directly or drive a motor operating as a generator to supply electric power to a battery system, whether the motor to operate as a motor to drive the e-axle or operate as a generator to charge the battery system.

7. The method of claim 1, wherein the vehicle drivetrain configuration comprises information regarding an engine of the vehicle, the e-axle, a battery system of the vehicle, and a motor/generator of the vehicle coupled to the e-axle, where the motor/generator is operable as a motor to receive electric power from the battery system to supply rotational power through the e-axle and as a generator to receive rotational power from the e-axle to generate electric power to charge the battery system.

8. The method of claim 1, further comprising determining second segment information corresponding to a second segment along the route after the segment.

9. The method of claim 1, wherein the segment information of the segment based on the route comprises one or more of a road surface, a road type, and a traffic rating for the segment.

10. A system, comprising:
    a sensor for determining a location of a vehicle over a route;
    a controller communicatively coupled to the sensor, the controller having a processor configured to execute a set of instructions stored on a non-transitory computer readable medium, wherein the instructions, when executed, cause the controller to:
    determine segment information of a segment based on the route of the vehicle and the location of the vehicle;
    determine a weight of the vehicle;
    determine vehicle drivetrain configuration and current values for a set of operating parameters of the vehicle;
    determine, from the vehicle drivetrain configuration, whether vehicle operation according to the current values of the set of operating parameters will reach a set of target values;
    in response to determining that the vehicle operation will not reach the set of target values, operate an e-axle of the vehicle into either an up position or in a down position, wherein operating the e-axle into the down position causes a set of wheels coupled to the e-axle contact a road surface, and operating the e-axle into the up position causes the set of wheels coupled to the e-axle to not contact the road surface.

11. The system of claim 10, wherein the vehicle weight is determined by determining a base vehicle weight and cargo weight of the vehicle.

12. The system of claim 10, wherein determining whether the vehicle operation reaches the set of target values comprises calculating a set of drivetrain efficiencies for the vehicle based on: an engine operating or not operating to drive the vehicle and charge a battery system, e-axle being in an up position or a down position, motor operating as a motor to supply rotational power to the e-axle or operating as a generator to generate electrical power from rotational power supplied by the engine or by regenerative capturing.

13. The system of claim 10, wherein the instructions, when executed, further cause the controller to:
    determine a second segment information corresponding to a second segment along the route after the segment.

14. The system of claim 10, wherein determining the current values of the set of operating parameters comprises determining whether operating an engine to on or off, whether the engine is engaged to a drive axle to drive the set of wheels directly or drive a motor operating as a generator to supply electric power to a battery system, whether the motor to operate as a motor to drive the e-axle or operate as a generator to charge the battery system.

15. The system of claim 10, wherein the vehicle drivetrain configuration comprises information regarding an engine of the vehicle, the e-axle, a battery system of the vehicle, and a motor/generator of the vehicle coupled to the e-axle, wherein the motor/generator is operable as a motor to receive electric power from the battery system to supply rotational power through the e-axle and as a generator to receive rotational power from the e-axle to generate electric power to charge the battery system.

16. The system of claim 10, wherein the instructions, when executed, further cause the controller to:

determine a set of operating conditions associated with the segment information of the route;

determine that the e-axle is in an incorrect position based on the set of operating conditions and segment information; and operate the e-axle of the vehicle into the up position or the down position.

17. The system of claim 16, wherein the set of operating parameters comprises weather, traffic, and road conditions associated with the segment.

18. The system of claim 10, wherein the segment information of the segment based on the route comprises one or more of a road surface, a road type, and a traffic rating for the segment.

19. The system of claim 10, wherein the set of operating parameters comprise at least one of an state of an engine of the vehicle, a rotations per minute (RPM) of the engine, an output power of the engine, a state of a motor/generator of the vehicle, and an input/output power of the motor/generator.

* * * * *